(12) United States Patent
Evans

(10) Patent No.: US 7,222,896 B2
(45) Date of Patent: May 29, 2007

(54) BUMPER HAVING SEPARATE ENERGY ABSORBER AND FASCIA SUPPORT

(75) Inventor: Darin Evans, Wixom, MI (US)

(73) Assignee: NetShape Energy Management LLC, Novi, MI (US)

( * ) Notice: Subject to any disclaimer, the term of this patent is extended or adjusted under 35 U.S.C. 154(b) by 43 days.

(21) Appl. No.: 11/157,442

(22) Filed: Jun. 21, 2005

(65) Prior Publication Data
US 2005/0280269 A1    Dec. 22, 2005

Related U.S. Application Data

(60) Provisional application No. 60/581,941, filed on Jun. 22, 2004.

(51) Int. Cl.
B60R 19/18 (2006.01)
B60R 19/22 (2006.01)
B60R 19/03 (2006.01)

(52) U.S. Cl. .......................... 293/120; 293/121; 293/122

(58) Field of Classification Search .............. 293/120, 293/121, 122, 109
See application file for complete search history.

(56) References Cited

U.S. PATENT DOCUMENTS

| 4,328,986 A | 5/1982 | Weller et al. |
| 5,100,187 A | 3/1992 | Loren |
| 5,711,562 A | 1/1998 | Terada et al. |
| 6,003,912 A | 12/1999 | Schonhoff et al. |
| 6,663,150 B1 | 12/2003 | Evans |
| 6,672,635 B2 | 1/2004 | Weissenborn et al. |
| 6,709,036 B1 | 3/2004 | Evans |
| 6,997,490 B2 * | 2/2006 | Evans et al. ................ 293/120 |
| 2004/0070220 A1 | 4/2004 | Evans |
| 2005/0017520 A1 | 1/2005 | Evans et al. |
| 2005/0057053 A1 | 3/2005 | Evans et al. |

* cited by examiner

Primary Examiner—D. Glenn Dayoan
Assistant Examiner—Melissa Black
(74) Attorney, Agent, or Firm—Price, Heneveld, Cooper, DeWitt & Litton LLP

(57) ABSTRACT

A bumper system includes a beam having mounts adapted for mounting the beam to a vehicle, and a thermoformed energy absorber positioned on a face of the beam for distributing impact energy prior to deformation of the beam. The bumper system further includes a fascia support having a first section with a rear concave surface matably engaging a front surface of the energy absorber and a second section with fascia attachment structure adapted for securing a fascia to the fascia support in a supported position. By constructing different fascia supports, different fascia can be supported on the same beam and energy absorber combination, thus saving tooling costs and reducing the number of different parts that must be inventoried.

4 Claims, 2 Drawing Sheets

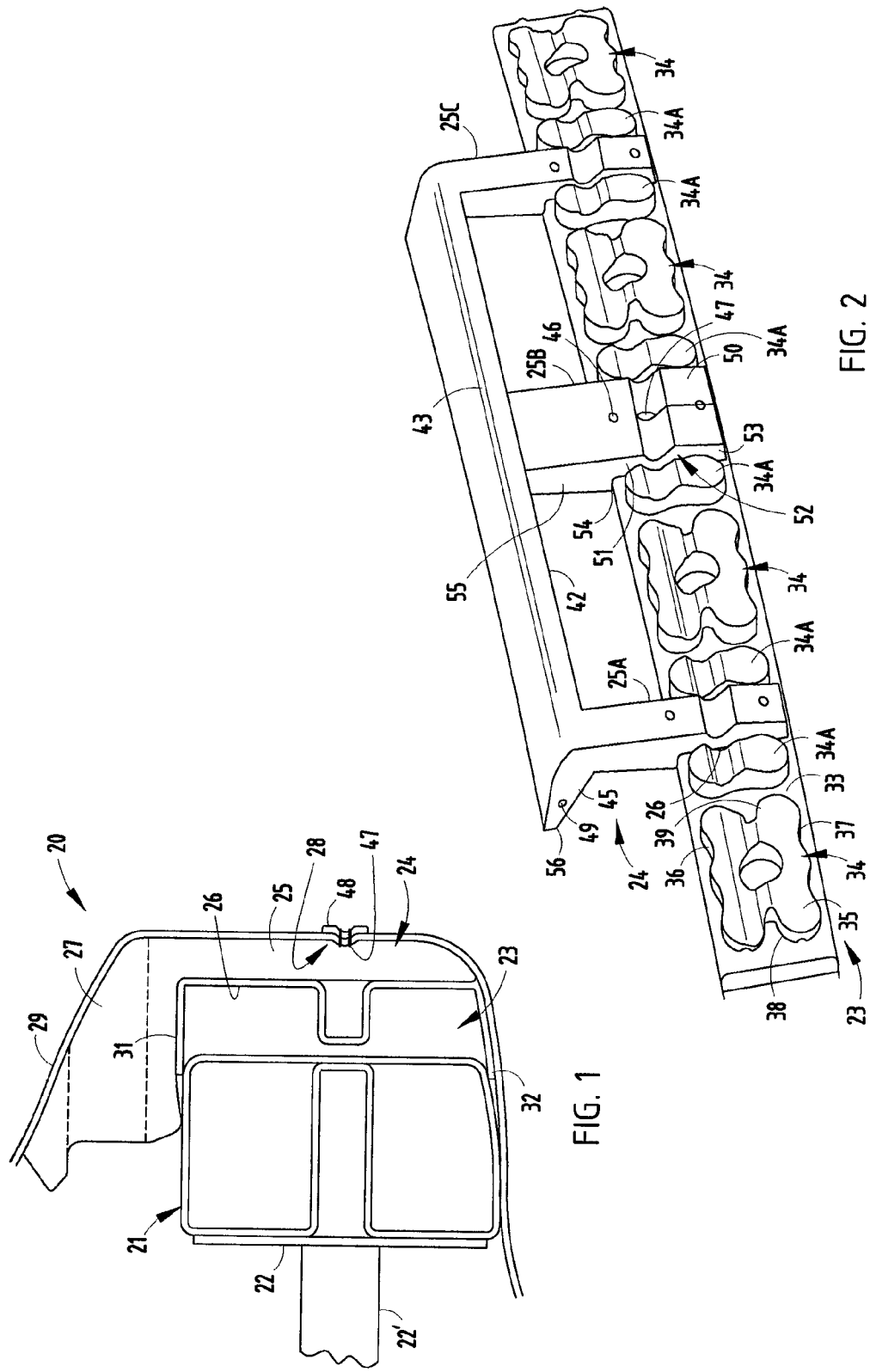

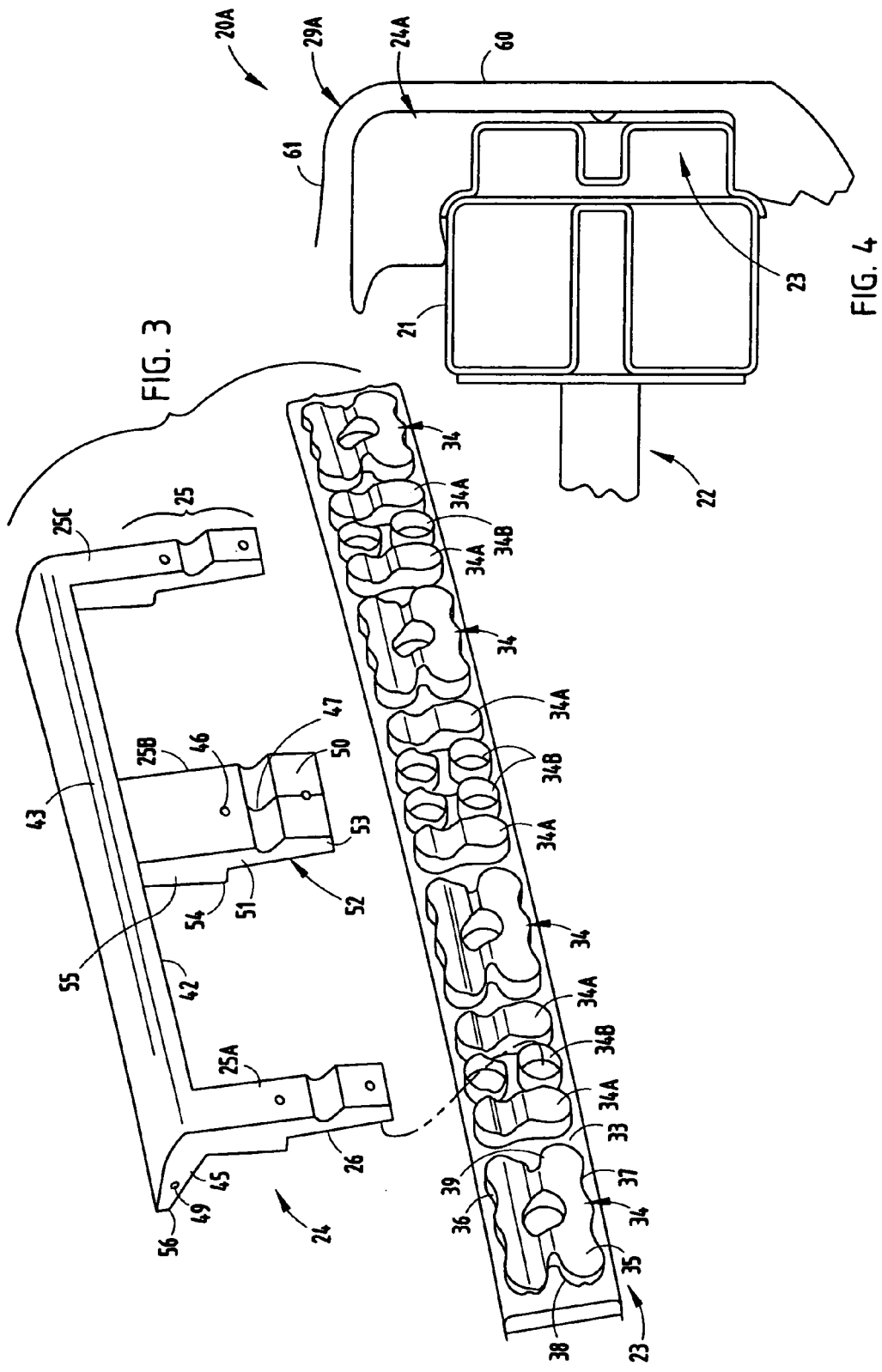

BUMPER HAVING SEPARATE ENERGY ABSORBER AND FASCIA SUPPORT

CROSS-REFERENCE TO RELATED APPLICATIONS

This application claims benefit of provisional application Ser. No. 60/581,941, filed Jun. 22, 2004, entitled BUMPER HAVING SEPARATE ENERGY ABSORBER AND FASCIA SUPPORT, the entire contents of which are incorporated herein in their entirety.

BACKGROUND

The present invention relates to a bumper system having a rigid beam, a plastic energy absorber, and a fascia support.

Many vehicle bumper systems have been developed that incorporate a beam and energy absorber for distributing and controlling impact energy. Fascia is often mounted to the vehicle for aesthetically covering the bumper system using brackets attached at various locations and to various front-end components. However, this results in a multitude of parts, each requiring separate inventories and separate manual attachment to the vehicle, each adding to a total cost of the vehicle. Also, each additional brackets potentially results in dimensional variations, and quality control problems. It is desirable to provide a more integrated fascia mounting system with fewer parts, and where the support is more directly off of the bumper system instead of off of other vehicle front end components located behind the bumper system.

At least one prior art bumper system incorporates an energy absorber made from a vacuum thermoformed sheet. However, it is difficult to provide closely controlled attachment sites for mounting fascia on a vacuum thermoformed sheet due to process limitations of vacuum thermoforming processes. Hence, there is a need for a bumper and energy management system that integrates the advantages of the low cost and flexibility of thermoformed parts with a fascia support structure that provides optimal accuracy and secure attachment sites for fascia.

Thus, a bumper system having the aforementioned advantages and solving the aforementioned problems is desired.

SUMMARY OF THE PRESENT INVENTION

In one aspect of the present invention, a bumper system includes a beam having mounts adapted for mounting the beam to a vehicle, and an energy absorber positioned on a face of the beam for distributing impact energy prior to deformation of the beam. The bumper system further includes a fascia support having a first section with a rear concave surface matably engaging a front surface of the energy absorber and a second section with fascia attachment structure adapted for securing a fascia to the fascia support in a supported position.

In a narrower form, different fascia are provided for use with a same beam and energy absorber combination.

These and other aspects, objects, and features of the present invention will be understood and appreciated by those skilled in the art upon studying the following specification, claims, and appended drawings.

BRIEF DESCRIPTION OF DRAWINGS

FIG. 1 is a cross-sectional view of a front-end construction with a bumper system embodying the present invention;

FIG. 2 is a perspective view of the energy absorber and mating fascia support of FIG. 2;

FIG. 3 is an exploded perspective view of FIG. 2; and

FIG. 4 is a cross-sectional view of an alternative front-end construction similar to FIG. 1.

DETAILED DESCRIPTION OF PREFERRED EMBODIMENTS

A bumper system 20 (FIG. 1) includes a beam 21 having mounts 22 adapted for mounting the beam 21 to a vehicle, and a thermoformed energy absorber 23 positioned on a face of the beam 21 for distributing impact energy prior to deformation of the beam 21. The bumper system 20 further includes a fascia support 24 comprising an injection-molded component having a first lower section 25 with a rear concave surface 26 matably engaging a front surface of the energy absorber 23 and bumper beam 21, and a second upper section 27 for supporting an upper part of the fascia 29. Fascia attachment structure 28 is provided as desired for securing the fascia 29 to the fascia support 24 in a well-supported stable position. By constructing different fascia supports, such as the different fascia support 24A (FIG. 4), a different fascia 29A can be supported on the same beam 21 and energy absorber 23 combination, thus saving tooling costs and reducing the number of different parts that must be inventoried.

The beam 21 (FIG. 1) has a B-shaped cross section. However, it is contemplated that the present inventive concepts can be used with other beams, such as "D" shaped, "C" shaped, and other shapes. The pair of vehicle mounts 22 include a plate attached to a rear surface of the beam 21 and rearwardly extending tube sections 22' for attaching the beam 21 to a vehicle frame.

The illustrated energy absorber 23 is vacuum thermoformed. This allows the energy absorber to be made from low-cost tooling, which tooling can be made quickly. However, it is contemplated that the present inventive concepts can be used with other energy absorbers, such as injection-molded energy absorbers, foam energy absorbers, and other energy absorbers known in the industry of vehicle bumper systems. In particular, an advantage of the present arrangement is that a given beam and energy absorber can receive different fascia supports, allowing the same beam and energy absorber combination to be used on different vehicles. Notably, the lower portion of the fascia support has its own impact-absorbing characteristics and can be specifically made to compliment the impact absorption characteristics of the beam and energy absorber to meet different impact criteria. This potentially allows the same beam and energy absorber to be used on different vehicle models within a given line of vehicles, . . . or to be used on front and rear bumper systems for the same model vehicle.

The illustrated thermoformed energy absorber 23 includes top and bottom flanges 31 and 32 that overlap onto top and bottom surfaces of the beam 21. The flanges 31 and 32 optionally include pads that frictionally engage the top and bottom beam surfaces for temporarily retaining the energy absorber 23 to the beam 21 during assembly. It is contemplated that other means can be used, such as hook tabs, separate push-pin fasteners, screws, and the like. The energy absorber 23 further includes a base wall 33 (FIG. 3) and a plurality of crush boxes (such as the illustrated crush boxes 34, 34A, 34B) formed forwardly from the base wall 33. The crush boxes 34, 34A, 34B have a front wall 35 and top, bottom, and side walls 36–39 shaped for optimal energy absorption as required for particular applications. The illustrated walls 35–39 include undulations and curvatures defining different box shapes, such as an "O" shape an "I shape, and a dot-circle shape. It is contemplated that an infinite variety of different box shapes can be made, such as "I" shaped, "X" shaped, "T" shaped, and the like. Notably, the front wall 35, top wall 36, and bottom wall 37 define a shape adapted to matably fit into the concave rear surface 26, as described below. The portions of the base wall 33 located between adjacent boxes 34 are sufficiently flexible to allow the energy absorber 23 to flex such that the energy absorber 23 will bend to closely fit against a face of an aerodynamically curved beam 21.

As noted above, the fascia support 24 includes a lower section 25 having a concave rear surface 26 for matably engaging a front of the beam 21, and an upper section 27 having fascia attachment structure 28. More specifically, the upper section 27 comprises a horizontally elongated beam section 42 with a front/top wall 43 optimally suited to support a particular fascia (i.e. the illustrated fascia 29). Reinforcement ribs 45 are provided that extend rearwardly from the front wall 43 to stiffen the wall 43.

The illustrated lower section 25 includes three downwardly-extending sections 25A, 25B and 25C, each having a rearwardly-facing C-shaped cross section including a front wall 50 and opposing side walls 51. The side walls 51 each have a rear edge 52 shaped to matably engage a front surface of the energy absorber 23. The illustrated rear edge 52 has a concavely shaped lower portion 53, a rearward projection 54 adapted to rest on a top of the energy absorber 23 and beam 21, an upwardly-extending section 55, and a second rearward projection 56. The second rearward projection 56 holds and supports a top section of the fascia 29 that extends across a vehicle along a front edge of the vehicle's engine compartment hood.

Attachment structure is provided on the fascia support 24 as desired. For example, the illustrated fascia support 24 includes attachment holes 46 for fasteners attaching the fascia support 24 and energy absorber to the beam 21, and includes apertured pad locations 47 for attaching a rub strip 48 and the fascia 23 to the fascia support 24, and further includes side attachment holes 49 for receiving fasteners that attach the upper section 27 of the fascia support 24 to a vehicle component such as a radiator support. A recess occurs horizontally across the lower sections 25A, 25B, 25C at a location where the fascia is shaped to receive the rub strip 48. Since the fascia support 24 is injection-molded, it can provide very accurate attachment locations and can provide apertured structural bosses for receiving self-tapping attachment screws. Also, the fascia support 24 can be made of an energy absorbing material such as Zenoy, made by GE Company. Also, the fascia support 24, and in particular the lower section 25 can be shaped for optimal energy absorption. For example, crush boxes can be molded into one or more of the sections 25A, 25B, 25C.

As illustrated by FIG. 4, a second fascia support 24A can be substituted for the fascia support 24, where a different fascia 29A is desired. For example, this may occur on a particular model vehicle where an up-level package or revised front end (such as may occur from one model year to the next model year) results in the different fascia 29A. In the illustrated arrangement, the fascia 29A has a much higher and more upright and "squared off" appearance, with a fairly long vertical front surface 60 and a rearwardly extending surface 61 that extends immediately in a substantially horizontal direction.

It is also contemplated that different energy absorbers can be substituted for the energy absorber 23, such as when a fully-loaded model vehicle is heavier than a "non-loaded" model vehicle resulting in different bumper impact requirements. For example, an injection-molded energy absorber might be used in a heavier fully-loaded model vehicle, while a thermoformed energy absorber could be used in the non-loaded model vehicle.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A bumper system comprising:
  a beam having mounts adapted for mounting the beam to a vehicle;
  an energy absorber positioned on a face of the beam for distributing impact energy prior to deformation of the beam; and
  a fascia support having a first section with a rear concave surface matably engaging a front surface of the energy absorber and a second section with fascia attachment structure adapted for securing a fascia to the fascia support in a supported position.

2. The bumper system defined in claim 1, wherein the second section of the fascia support extends above the first section and includes enlarged openings adapted to pass ambient air over the beam to a vehicle radiator.

3. The bumper system defined in claim 1, wherein the energy absorber is thermoformed.

4. The bumper system defined in claim 1, including a second fascia support having a lower section with a second concave surface of identical shape to the first-mentioned rear concave surface, and having an upper section with second attachment structure that is different than the first-mentioned fascia attachment structure, the first-mentioned and second fascia supports being selectively attachable to the beam and energy absorber as desired.

* * * * *